(12) United States Patent
Ueyama et al.

(10) Patent No.: US 6,380,652 B1
(45) Date of Patent: *Apr. 30, 2002

(54) REMOTE BEARING DEVICE WITH REMOTE DIAGNOSTIC CAPABILITY

(75) Inventors: Hirochika Ueyama, Hirakata; Manabu Taniguchi, Kashihara, both of (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/679,076

(22) Filed: Oct. 5, 2000

Related U.S. Application Data

(62) Division of application No. 09/208,428, filed on Dec. 10, 1998, which is a division of application No. 08/841,810, filed on May 5, 1997, now abandoned.

(30) Foreign Application Priority Data

May 13, 1996 (JP) .............................. 8-117381

(51) Int. Cl.[7] .............................................. H02K 7/09
(52) U.S. Cl. ..................................................... 310/90.5
(58) Field of Search ........................................ 310/90.5

(56) References Cited

U.S. PATENT DOCUMENTS

| | | | |
|---|---|---|---|
| 4,435,771 A | * 3/1984 | Nozawa et al. ............. | 364/474 |
| 5,027,280 A | * 6/1991 | Ando et al. ................. | 361/16 |
| 5,130,589 A | * 7/1992 | Kanemitsu ................... | 310/90.5 |
| 5,133,158 A | * 7/1992 | Kihara et al. ............... | 51/165.77 |
| 5,578,880 A | * 11/1996 | Lyons et al. ................. | 310/90.5 |
| 5,598,536 A | * 1/1997 | Slaughter, III ............. | 395/200.16 |

FOREIGN PATENT DOCUMENTS

| | | | |
|---|---|---|---|
| JP | 1-195994 | * 8/1989 | ................. 310/90.5 |
| JP | 9-177781 | * 7/1997 | ................. 310/90.5 |

OTHER PUBLICATIONS

Advantages of Magnetic Bearings . . . , European Power News, p. 29., 5/1993.*

* cited by examiner

Primary Examiner—Karl Tamai
(74) Attorney, Agent, or Firm—Jacobson Holman, PLLC

(57) ABSTRACT

A magnetic bearing device comprises a machine main body having position sensors for detecting the position of a rotary body and magnetic bearings for magnetically contactlessly supporting the rotary body, a controller for controlling the magnetic bearings based on the signals from the position sensors, a data processing computer installed at a location away from the controller, and modems for connecting the controller to the computer by communication lines.

5 Claims, 3 Drawing Sheets

REMOTE BEARING DEVICE WITH REMOTE DIAGNOSTIC CAPABILITY

This is a Divisional of application Ser. No. 09/208,428 filed Dec. 10, 1998.

BACKGROUND OF THE INVENTION

The present invention relates to magnetic bearing devices for rotating a rotary body as magnetically supported by magnetic bearings without contact.

Magnetic bearing devices, for example, for use in turbo molecular pumps of the magnetic bearing type comprise a machine main body having position sensors for detecting the position of a rotary body and magnetic bearings for magnetically contactlessly supporting the rotary body, and control means for controlling the magnetic bearings based on the signals from the position sensors. While many magnet bearing devices produced by a certain manufacturer are used by users at widely separated locations, the bearing devices are independent of one another and are conventionally controlled and maintained individually. Accordingly, the magnetic bearing device can not be checked for operating state or for the diagnosis of failure at a place other than the actual location of the device (the site of installation of the device for the user). Although the device as installed requires periodic maintenance, the manufacturer is unable to recognize or grasp the operating state of the device as stated above, so that every time need arises, the manufacturer must dispatch the technician to the site for him to grasp the operating state or to diagnose failure and to thereafter adjust the control means. Since such work at the installation site must be performed for each of the magnetic bearing devices of the users at various remote locations, there is the problem that the work requires much time and labor. Further the control circuits of the control means of magnetic bearing devices comprise an analog circuit and digital circuit. In the case of either circuit, a need is likely to arise to improve or alter the magnetic bearing control characteristics during use. In such an instance, the manufacturer must dispatch the technician to the site for the adjustment of the control circuit as in the above case.

SUMMARY OF THE INVENTION

An object of the present invention is to overcome the foregoing problems and to provide a magnetic bearing device which is accessible from a remote location for the recognition of the operating state thereof and for the adjustment of control means thereof.

The present invention provides a magnetic bearing device characterized in that the device comprises a machine main body having position sensors for detecting the position of a rotary body and magnetic bearings for magnetically contactlessly supporting the rotary body, control means for controlling the magnetic bearings based on signals from the position sensors, data processing means installed at a location away from the control means, and communication means for connecting the control means to the data processing means by communication lines.

The communication means connecting the control means to the data processing means allows data communication between the control means and the data processing means, making it possible to grasp the operating state of the machine main body or to adjust the control means using the data processing means as installed at a remote location.

The communication means, which is preferably one allowing interactive communication between the control means and the data processing means, is one at least enabling the control means to transmit communications to the data processing means.

In the case where communications are transmitted only from the control means to the data processing means, for example, data relating to the operating state of the machine main body (e.g., data as to the position of the rotary body or data as to control current values for the magnetic bearings) is sent to the data processing means via the communication means.

This enables the data processing means to recognize the operating state of the machine main body. When the data processing means is installed at the location of the manufacturer, therefore, the manufacturer can grasp the operating state of the machine main body without dispatching the technician to the installation site. It is also possible to diagnose failure from the data relating to the operating state, and even if the result of diagnosis indicates a need to adjust the control means at the site, it is only the adjustment of the control means that must be made at the site. The work time at the site can then be shortened. Further if only the adjustment of the control means is necessary, the user's technician may be able to meet the need.

In the case where the control means and the data processing means are adapted for interactive communication therebetween, the control means, for example, transmits data relating to the operating state of the machine main body to the data processing means through the communication means, and the processing means transmits control parameters for the magnetic bearings to the control means through the communication means.

As in the foregoing case, the data relating to the operating state of the machine main body and transmitted from the control means to the data processing means enables the processing means to grasp the operating state of the machine main body, while the control means can be adjusted by transmitting the magnetic bearing control parameters from the processing means to the control means. When the data processing means is installed at the location of the manufacturer, therefore, the manufacturer is able to recognize the operating state of the machine main body, diagnose failure and adjust the control means without dispatching the technician to the site of installation. In this case, the data processing means may be adapted to automatically determine the data as to the control of the magnetic bearings, such as magnetic bearing control parameters, based on the machine main body operating state or the result of diagnosis of failure, or the technician may determine the data and input the data to the data processing means.

For example, the machine main body and the control means are provided in more than one set.

The sets of machine main body and control means may be installed at one location or at a plurality of separated locations.

It is then possible to grasp the operating state of machine main bodies at a remote location or remote locations or to grasp the operating state thereof and to adjust the control means by (one or a plurality of) common data processing means. Accordingly, the data processing means, when installed at the location of the manufacturer, enables the manufacturer to provide centralized supervision over the machine main bodies and control means which are installed at various locations for different users.

For example, the control means comprises an A/D converter for converting analog signals from the position sensors into digital position signals and outputting the digital position signals, a digital signal processor for determining control current values to be given to the magnetic bearings based on the digital position signals and outputting the values as digital control signals, and a D/A converter for converting the digital control signals into analog signals and feeding the resulting analog signals to the magnetic bearings.

The term the "digital signal processor" as used herein refers to specific hardware adapted to receive digital signals and to deliver digital signals, programmable by software and operable for high-speed real-time processing. The processor will hereinafter be referred to as "DSP."

When provided with the DSP, the control means is capable of processing signals at a high speed in real time.

For example, the control means comprises first memory means for storing data relating to the position of the rotary body and obtained from the position sensors and data as to the control current values determined by the digital signal processor for the magnetic bearings, and second memory means for storing magnetic bearing control parameters transmitted from the data processing means through the communication means. The digital signal processor feeds the data relating to the position of the rotary body and the data as to the control current values for the magnetic bearings to the first memory means, causes the first memory means to store the data and reads the magnetic bearing control parameters from the second memory means for use as new control parameters. The data processing means reads the data relating to the position of the rotary body and the data as to the control current values for the magnetic bearings from the first memory means through the communication means, transmits the magnetic bearing control parameters to the second memory means through the communication means and causes the second memory means to store the parameters.

The data processing means is then able to grasp the operating state of the machine main body and to adjust the control means.

DESCRIPTION OF THE PREFERRED EMBODIMENTS

Embodiments of the present invention will be described below with reference to the drawings.

Figure 1:
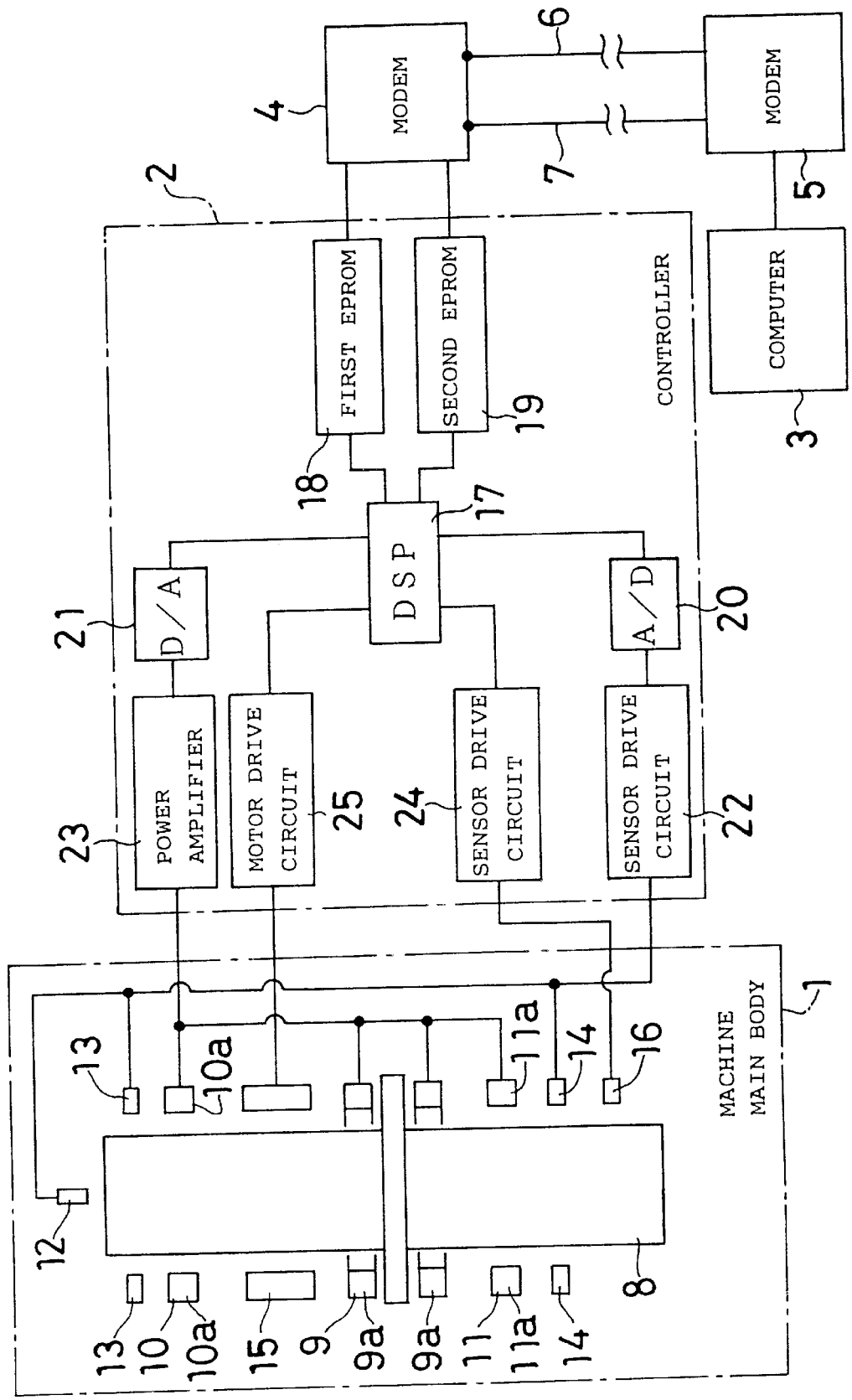
FIG. 1 is a diagram showing the construction of a magnetic bearing device as a first embodiment of the invention.

FIG. 1 shows a first embodiment.

With reference to FIG. 1, the magnetic bearing device comprises a machine main body 1, controller 2 serving as control means, computer (e.g., personal computer) 3 serving as data processing means and two modems 4, 5 serving as communication means. The machine main body 1, controller 2 and first modem 4 are installed, for example, at the location of a user, and the computer 3 and second modem 5 at a remote location, for example, at the location of the manufacturer. The two modems 4, 5 are connected to communication lines 6, 7 such as telephone lines.

When the device is used as a turbo molecular pump of the magnetic bearing type, the machine main body 1 serves as the pump main body. The main body 1 has a shaftlike rotary body 8 vertically disposed within a casing (not shown). Also provided within the casing are an axial magnetic bearing 9 and upper and lower two radial magnetic bearings 10, 11 for magnetically contactlessly supporting the rotary body 8, an axial position sensor 12 for detecting the position of the rotary body 8 with respect to the axial direction thereof, upper and lower two radial position sensors 13, 14 for detecting the position of the rotary body 8 with respect to radial directions thereof, a built-in high-frequency motor 15 serving as means for rotatingly driving the rotary body 8 at a high speed, and a rotational speed sensor 16 for detecting the speed of rotation of the rotary body 8. Usually, the axial magnetic bearing 9 comprises a pair of electromagnets 9a, and each of the radial magnetic bearings 10, 11 comprises two pairs of electromagnets 10a or 11a. These magnetic bearings 9, 10, 11, position sensors 12, 13, 14, motor 15 and rotational speed sensor 16 are known and therefore will not be described in detail.

The controller 2 serves to control the bearings 9, 10, 11 and the motor 15. The controller 2 comprises a DSP 17, first EPROM 18 serving as first memory means, second EPROM 19 serving as second memory means, A/D converter 20, D/A converter 21, position sensor drive circuit 22, power amplifier 23, rotational speed sensor drive circuit 24 and motor drive circuit 25. The DSP 17 performs the control operation and communication, has a parallel link and modem ports allowing communication with an external device and is connected via the EPROMs 18, 19 to the first modem 4. The first EPROM 18 serves to store the data to be transmitted. The second EPROM 19 serves to store the program to be executed by the DSP 17 and the data received. The DSP 17 is connected to the communication lines 6, 7 by way of the EPROMs 18, 19 and the first modem 4. The computer 3 is connected via the second modem 5 to the communication lines 6, 7. The modems 4, 5 have a communication capacity of at least 28800 bps.

The position sensors 12, 13, 14 are driven by the sensor drive circuit 22. Based on the outputs from the sensors 12, 13, 14, the drive circuit 22 detects the axial position of the rotary body 8 and the radial position thereof at upper and lower two locations. The analog position signals from the sensor drive circuit 22 are converted by the A/D converter 20 into digital position signals, which are fed to the DSP 17. Based on the digital position signals, the DSP 17 controls the exciting currents of the electromagnets 9a, 10a, 10b of the respective magnetic bearings 9, 10, 11. Digital control signals corresponding to current command values from the DSP 17 are converted by the D/A converter 21 into analog control signals, based on which the power amplifier 23 supplies exciting currents to the respective electromagnets 9a, 10a, 11a, with the result that the rotary body 8 is contactlessly supported at a specified position with respect to the axial and radial directions. The rotational speed sensor 16 is driven by the sensor drive circuit 24, which detects the speed of rotation of the rotary body 8 from the output from the sensor 16. The sensor drive circuit 24 feeds a rotational speed detection signal to the DSP 17, which in turn controls the speed of the rotary body 8 based on the detection signal. The DSP 17 delivers a rotational speed command signal to the motor drive circuit 25, which in turn drives the motor 15 based on the signal. Consequently, the rotary body 8 is rotated at a predetermined speed. The detection of the position of the rotary body 8, detection of the rotational speed of thereof, production of the current command value and delivery of the rotational speed command value are made at a predetermined time interval.

Every time the position and rotational speed of the rotary body 8 are detected during the operation of the magnetic bearing device, the DSP 17 stores the position data and speed data in the first EPROM 18. Every time the current command value is delivered, the DSP stores the command value data in the first EPROM 18. These items of data are then sent from the first EPROM 18 to the computer 3 via the first modem 4, communication line 6 and second modem 5. Thus, the operating state of the machine main body 1 can always be monitored and grasped at a remote location. Further when required, the control characteristics of the controller 2, such as the control parameters for the magnetic bearings 9, 10, 11, the predetermined speed of the motor 15 and sampling time interval, can be altered on the computer 3. The altered data is transmitted to the controller 2, whereby the control characteristics of the controller 2 can be adjusted from the remote location. The data thus set by the computer 3 is sent to the DSP 17 via the second modem 5, communication line 7, first modem and second EPROM 19 and is stored in a specified location of the second EPROM 19. The machine main body 1 is thereafter controlled using the data thus stored, i.e., the altered control characteristics.

Although the controller comprises a DSP and two EPROMs in the case of the foregoing embodiment, the memory means within the DSP is usable for the DSP only to constitute the controller. The memory means within the DSP is then usable as the first and second memory means.

Further according to the embodiment, the magnetic bearings 9, 10, 11 and the motor 15 are under the control of the single DSP 17, whereas the bearings 9, 10, 11 only may be controlled by the DSP 17, with the motor 15 made controllable independently by other control means.

Figure 2:
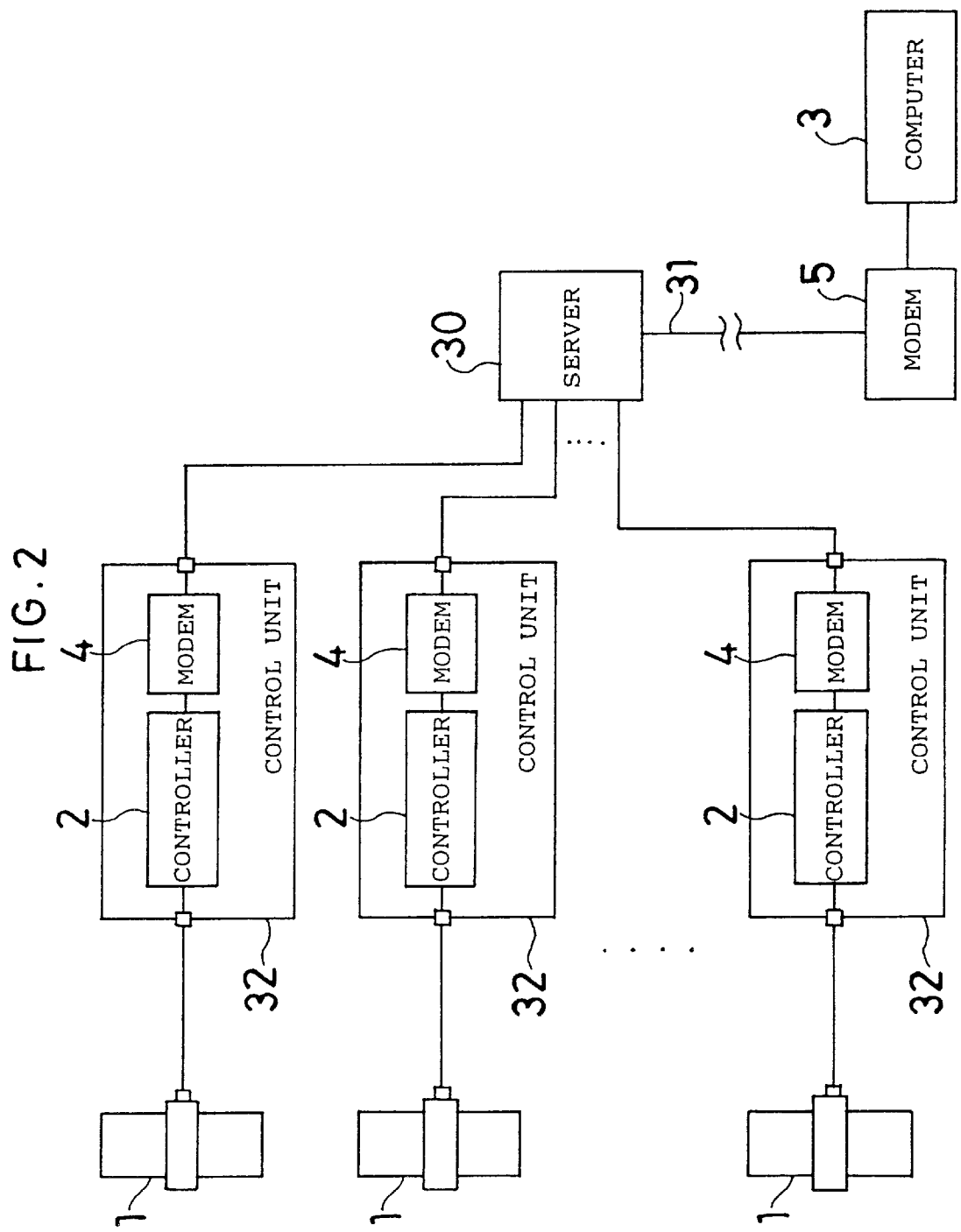
FIG. 2 is a diagram showing the construction of a magnetic bearing device as a second embodiment of the invention.
Figure 3:
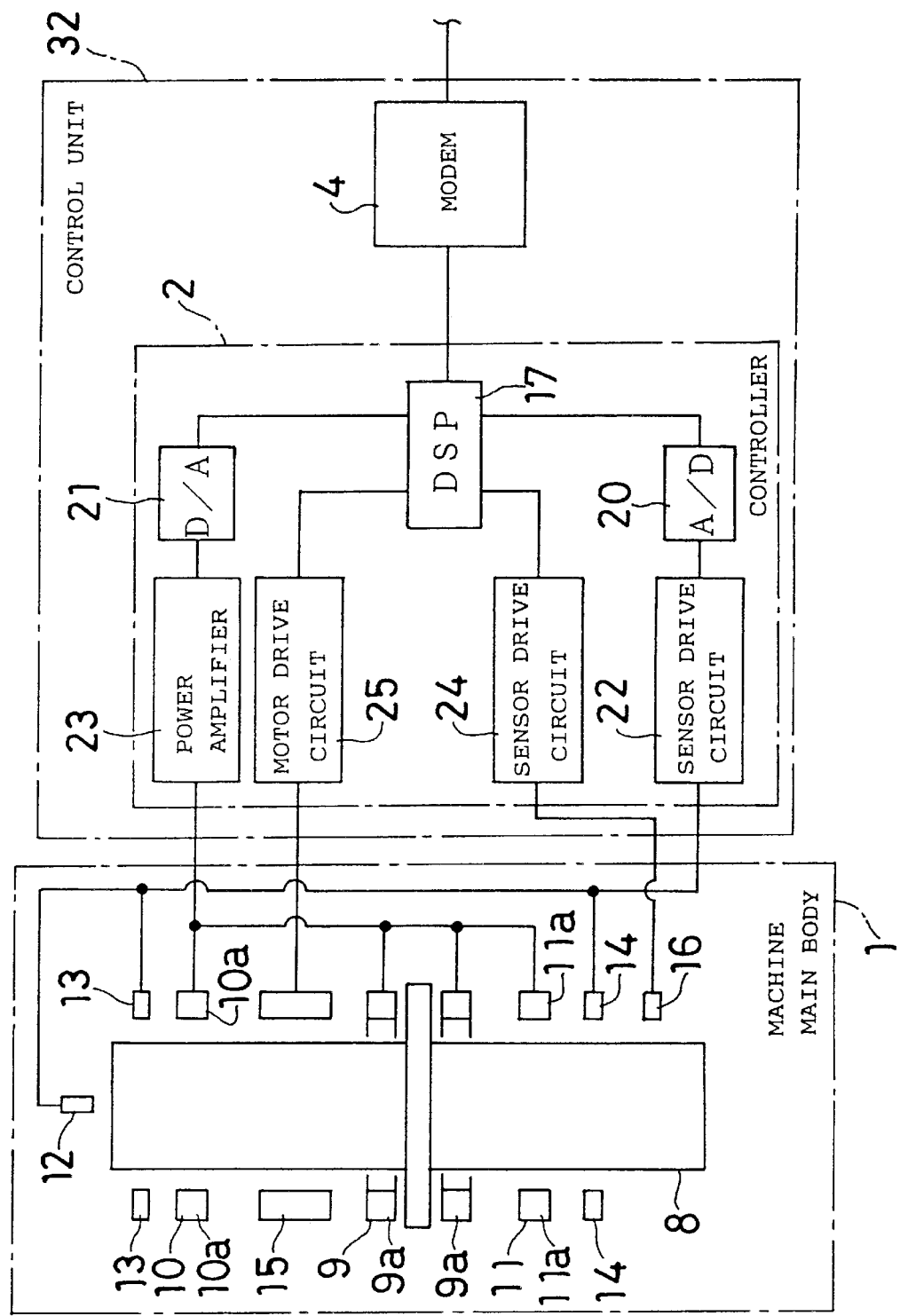
FIG. 3 is a diagram showing the construction of a set of machine main body and controller of FIG. 2.

FIGS. 2 and 3 show a second embodiment. Throughout FIGS. 1 to 3, like parts are designated by like reference numerals. The second embodiment comprises a plurality of sets of machine main body 1 and controller 2. FIG. 2 shows the overall construction of the magnetic bearing device, and FIG. 3 shows one set of machine main body 1 and controller 2 in greater detail.

In the case of the second embodiment, the controllers 2 of the sets are connected via respective first modems 4 to a single server 30, which is connected by ISDN 31 serving as communication lines to a second modem 5 connected to a computer 3. The controller 2 and the first modem 4 of each set are assembled into a single control unit 32. The controller 2 is equivalent to the controller 2 of the first embodiment from which the two EPROMs 18, 19 are removed, and the DSP 17 is connected to the first modem 4. The memory (not shown) incorporated in the DSP 17 serves the function of the EPROMs 18, 19. The construction of the rest of the controller 2 is the same as in the first embodiment. The machine main body 1 has the same construction as in the first embodiment.

With the second embodiment, communications are transmitted between the computer 3 and the controllers 2 of the sets in the same manner as in the case of the first embodiment. In this case, data transmission from the controller 2 and data transmission from the computer 3 are effected alternately.

When the control units 32 as installed for one user or for different users are connected to the ISDN 31 according to the second embodiment, the single computer 3 as installed at the location of the manufacturer then provides centralized supervision over these control units. The single computer 3 is connected to the ISDN 31 according to the second embodiment, whereas if, for example, a plurality of computers 3 as installed at different locations are connected to the ISDN 31, the sets of machine main body 1 and control unit 32 can be supervised in a centralized manner at any of these locations.

What is claimed is:

1. A magnetic bearing device, comprising:
   a) a machine main body including:
      a1) position sensors for detecting the position of a rotary body;
      a2) magnetic bearings for magnetically contactlessly supporting the rotary body;
      a3) a rotational speed sensor for detecting the speed of rotation of the rotary body; and
      a4) a motor for rotatingly driving the rotary body;
   b) control means for controlling the magnetic bearings based on signals from the position sensors, wherein the control means includes:
      b1) an analog-to-digital converter for converting analog signals from the position sensors into digital position signals and for outputting the digital position signals;
      b2) a sensor drive circuit for driving the rotational speed sensor;
      b3) a motor drive circuit for driving the motor;
      b4) a digital signal processor for determining control current values to be given to the magnetic bearings based on the digital position signals for outputting the values as digital control signals, for recognizing the operating state of the machine body, for diagnosing failure, for adjusting the control means, for driving the rotational speed sensor drive circuit, and for driving the motor drive circuit; and
      b5) a digital-to-analog converter for converting the digital control signals into analog signals and for feeding the analog signals to the magnetic bearings;
   c) data processing means installed at a location away from the control means;
   d) communication means for connecting the control means to the data processing means by public communication lines;
   I) the control means also including:
      b6) first memory means for storing:
         b6.1) first data relating to a position of the rotary body and obtained from the position sensors; and
         b6.2) second data as to the control current values determined by the digital signal processor for the magnetic bearings; and
      b7) second memory means for storing:
         b7.1) magnetic bearing control parameters transmitted from the data processing means through the communication means;
   II) the digital signal processor including:
      b4.1) means for feeding the first data and the second data to the first memory means; and
      b4.2) means for reading the magnetic bearing control parameters from the second memory means, for use as new control parameters; and
   III) the data processing means including:
      c1) means for reading the first data and the second data from the first memory means through the communication means; and
      c2) means for transmitting the magnetic bearing control parameters to the second memory means through the communication means.

2. The device of claim 1, wherein:
   the machine main body and the control means are provided as separate units.

3. The device of claim 1, wherein:

the communication means includes modems.

4. The device of claim 1, wherein the communication lines include telephone lines.

5. The device of claim 1, wherein the communication lines include integrated services network (ISDN) lines.

* * * * *